United States Patent
Paczkowski et al.

(10) Patent No.: US 9,258,707 B1
(45) Date of Patent: Feb. 9, 2016

(54) TIMING SECURITY FLAGS IN COMMON PUBLIC RADIO INTERFACE

(71) Applicant: Sprint Communications Company L.P., Overland Park, KS (US)

(72) Inventors: Lyle Walter Paczkowski, Mission Hills, KS (US); Matthew C. Schlesener, Shawnee, KS (US); William M. Parsel, Overland Park, KS (US); Carl Joseph Persson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 197 days.

(21) Appl. No.: 14/033,633

(22) Filed: Sep. 23, 2013

(51) Int. Cl.
*H04J 3/24* (2006.01)
*H04W 12/06* (2009.01)

(52) U.S. Cl.
CPC .................................... *H04W 12/06* (2013.01)

(58) Field of Classification Search
USPC .............. 370/474, 338, 392, 335, 320, 339, 370/395.3, 389, 503; 455/561
See application file for complete search history.

(56) References Cited

U.S. PATENT DOCUMENTS 4,709,347 A * 11/1987 Kirk ............................ 709/248
8,041,392 B2 * 10/2011 Yamamoto .................. 455/561
2013/0017852 A1 1/2013 Liu et al.

FOREIGN PATENT DOCUMENTS

EP 2525623 11/2012

OTHER PUBLICATIONS

"The OCT2224W System-on-Chip devices are very low-power, high-performance multi-core DSPs, coupled with an optional ARM11 processor and a complete software development suite;" OCT2224W Technical Product Brief; Jun. 19, 2010; pp. 1-4; Octasic.

* cited by examiner

*Primary Examiner* — Chi H Pham
*Assistant Examiner* — Alexander O Boakye (57) ABSTRACT

Examples disclosed herein provide systems, methods, and software for communication using Common Public Radio Interface. In one example, a system for CPRI communication includes a radio equipment control system configured to generate a timing security flag for a basic frame, insert the security flag into the basic frame, and initiate transfer of the basic frame to a radio equipment system. The radio equipment system is further configured to receive the basic frame, identify validity of the timing security flag, and upon validation, update timing on the radio equipment.

19 Claims, 6 Drawing Sheets

TIMING SECURITY FLAGS IN COMMON PUBLIC RADIO INTERFACE

TECHNICAL BACKGROUND

Wireless communication systems typically include wireless access systems with equipment such as wireless access nodes along with various control and routing nodes that provide wireless access to communication services for wireless communication devices over wireless links. A typical wireless communication system includes systems to provide wireless access across a geographic region, with wireless coverage areas associated with individual wireless access nodes. The wireless access systems exchange user communications between wireless communication devices, service providers, and other end user devices. The user communications typically include voice calls, data exchange, web pages, streaming media, or text messages, among other communication services.

Within the wireless communication systems, interfaces are used to communicate between radio equipment control (REC) and radio equipment (RE). One such interface is Common Public Radio Interface or CPRI. CPRI is an initiative to provide interoperability of equipment from different vendors, but to allow software investment for the different wireless service providers. Typically, conventional base stations are located adjacent to an antenna at the base of the antenna tower. However, finding suitable sites can be a challenge because of the footprints required for the base stations, the need for structural reinforcement of rooftops, and the availability of both primary and backup power sources.

Instead of placing the base station at the bottom of the antenna, CPRI allows a distributed architecture where base stations, containing the REC, are connected to remote radio heads via fibre links that carry the CPRI data. Thus, the REC may be placed in one central, convenient location, while the radio equipment may be placed in remote areas that are sensitive to base stations.

OVERVIEW

Examples disclosed herein provide systems, methods, and software for Common Public Radio Interface (CPRI) communication. In one example, a system for CPRI communication includes a radio equipment control system configured to generate a timing security flag for a basic frame, insert the security flag into the basic frame, and initiate transfer of the basic frame to a radio equipment system. The radio equipment system is further configured to receive the basic frame, identify validity of the timing security flag, and upon validation, update timing on the radio equipment.

In another example, a method of operating a radio equipment control system includes generating a timing security flag for a basic frame and inserting the timing security flag into the basic frame. The method further includes initiating transfer of the basic frame to a radio equipment system.

In a further example, a method of operating a radio equipment system includes receiving a basic frame that was transmitted by a radio equipment control system and identifying validity of a timing security flag within the basic frame. The method further includes, upon validation of the timing security flag, updating timing on the radio equipment.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

Figure 1:
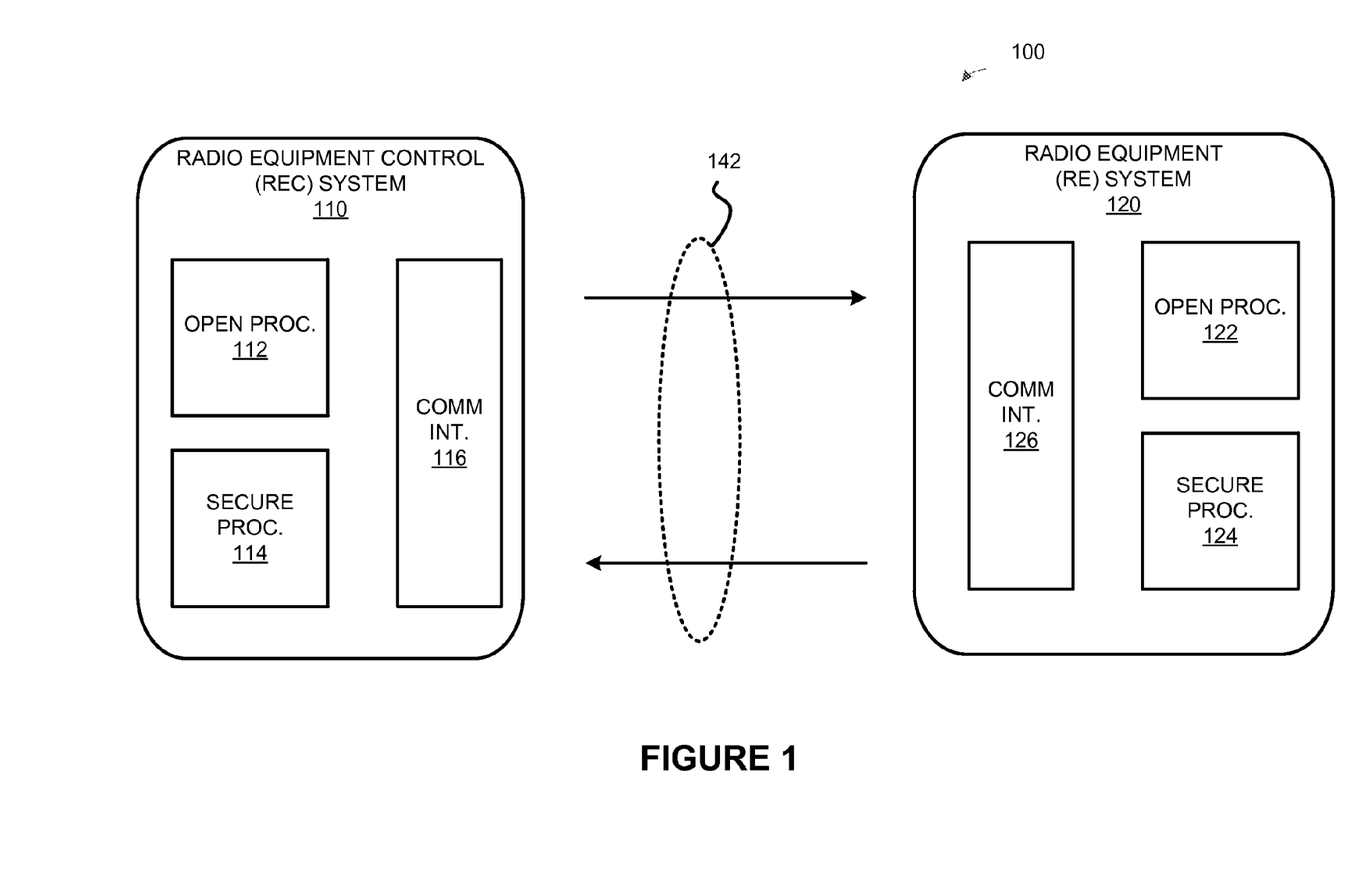
FIG. 1 illustrates a Common Public Radio Interface System 100 for secure communication.

FIG. 1 illustrates a communication system 100 for communicating using Common Public Radio Interface or CPRI. Communication system 100 includes radio equipment control (REC) system 110, radio equipment (RE) system 120, and communication link 142. REC system 110 further includes secure processing circuitry 114, open processing circuitry 112, and communication interface 116. RE system further includes open processing circuitry 122, secure processing circuitry 124, and communication interface 126.

In operation REC system 110 will communicate with RE system 120 using CPRI protocol. CPRI protocol was developed to provide interoperability of equipment from different vendors, but to allow software investment for the different wireless service providers. CPRI protocol includes hyperframes that are made up of basic frames to carry data between REC system 110 and RE system 120. Basic frames include control information, which includes timing and synchronization information, as well as data block information.

Figure 2:
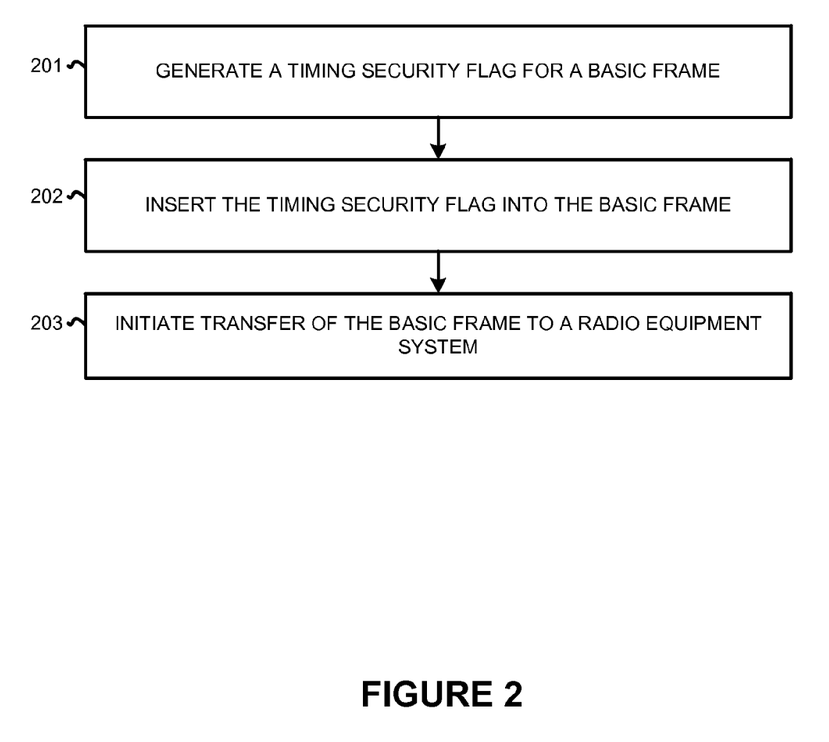
FIG. 2 illustrates a method of operating a radio equipment control system.
Figure 3:
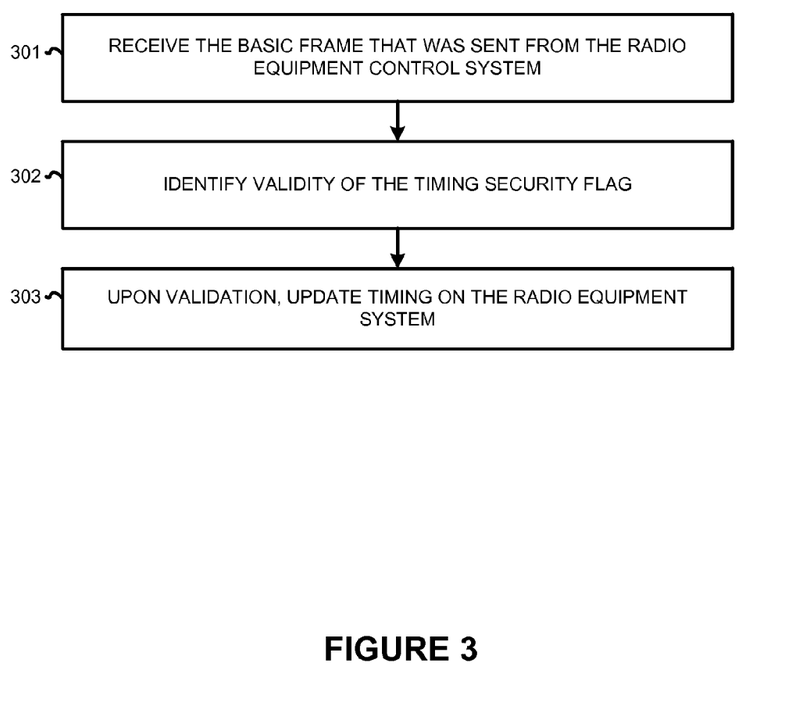
FIG. 3 illustrates a method of operating a radio equipment system.

To better illustrate the functionality of using CPRI protocol to transfer information between REC system 110 and RE system 120, methods are provided in FIGS. 2 and 3. FIG. 2 illustrates a method of operating REC system 110 according to one example. The method includes generating a timing security flag for a basic frame (201). In generating the security flag, secure processing circuitry 114 may use a flag that is already stored within the REC system, may generate a flag based on hashing, may generate an arbitrary or random bit pattern based on a variety of inputs, or any other method of generating a timing flag. Once the flag has been generated using secure processing circuitry 114, the flag is then inserted into the basic frame (202). This frame includes both data, as well as timing and synchronization control information for the CPRI protocol. In some examples, the timing security flag will be inserted in the control information as the control information allows for provider specific information. Following the insertion of the flag, REC system 110 then initiates transfer of the basic frame to a RE system 120 using communication link 142 (203). The flag may then be used by RE system 120 to ensure the validity of the frame that is being received.

FIG. 3 illustrates a method of operating RE system 120 to receive a frame from REC system 110. In the present example, REC system receives the basic frame that was sent from REC system 110 (301). This frame may be received at communication interface 126 and then passed to secure processing circuitry 124 or open processing system 122. Following the receipt of the frame, the validity of the timing security flag is determined using secure processing circuitry 124 (302). In some examples, secure processing circuitry 124 may reverse the process that was done on REC system 110 to ensure that the flag is valid. In other instances, secure processing circuitry 124 may generate its own flags that are identical to the flags generated in REC system 110. Thus, secure processing circuitry 124 can compare the flags that are received at communication interface 126 with the flags prepared on RE system 120. If the flag received in the basic frame is determined to be valid, then the timing is updated for RE system based on the control information in the frame (303). If, however, the frame is considered to be invalid then RE system 120 may either stop the reception of future frames, or flag the issue for further investigation. This flagging could include contacting an administrator or some other method of flagging the timing issue.

Returning to FIG. 1, REC system 110 includes computer processing systems and equipment to transmit, using CPRI protocol, to RE systems. REC system 110 includes one or more processing systems for open processing circuitry 112 and secure processing circuitry 114. REC system 110 further includes communication interface 116 to communicate over communication link 142, which can include wired, optical, or wireless links. REC system 110 may also include user interface systems, memory devices, non-transitory computer-readable storage mediums, software, processing circuitry, or some other communication components.

In the present example, the processing system of REC system 110 includes open processing circuitry 112 and secure processing circuitry 114. Each circuitry of the processing system may be implemented in a separate microprocessor, microprocessor core, virtual core, or other hardware or software partition that separates memory spaces, operating systems, drivers, and other operational hardware and software elements so as to provide a restricted level of access for the creation of the timing security flags.

RE system 110 includes computer processing systems and equipment to receive CPRI protocol from REC system 120. RE system 110 includes one or more processing systems for open processing circuitry 122 and secure processing circuitry 124. RE system 120 further includes communication interface 126 to communication over communication link 142, which can include wired, optical, or wireless links. RE system 120 may also include user interface systems, memory devices, non-transitory computer-readable storage mediums, software, processing circuitry, or some other communication components.

In the present instance, the one or more processing systems in RE system 120 include open processing circuitry 122 and secure processing circuitry 124. Each circuitry of the processing system may be implemented in a separate microprocessor, microprocessor core, virtual core, or other hardware or software partition that separates memory spaces, operating systems, drivers, and other operational hardware and software elements so as to provide a restricted level of access for the verification of the timing security flags.

Communication link 142 may use metal, glass, optical, air, space, or some other material as the transport media. Communication link 142 uses CPRI protocol to communicate between REC system 110 and RE system 120. Communication link 142 may be a direct link or may include intermediate networks, systems, or devices, and may include a logical network link transported over multiple physical links.

Although illustrated as a system containing a single REC system and a single RE system, it should be understood that a plurality of RE systems may be connected to the REC system. This plurality of RE systems may be daisy chained out from the REC system, may be connected in parallel from the REC system, or may be connected in a variety of other ways to the REC system. The REC system may then provide data to these RE systems using the same CPRI protocol.

Further, although FIGS. 1-3 illustrate the transmission of a single timing security flag, these security flags may be repeated at a variety of intervals. For example, the timing security flag may be transmitted with every frame, every hyperframe, or at any other periodic time. The transmitted security flags will ensure that the transmission has not been interrupted or interfered with between the REC system and the RE system.

Figure 4:
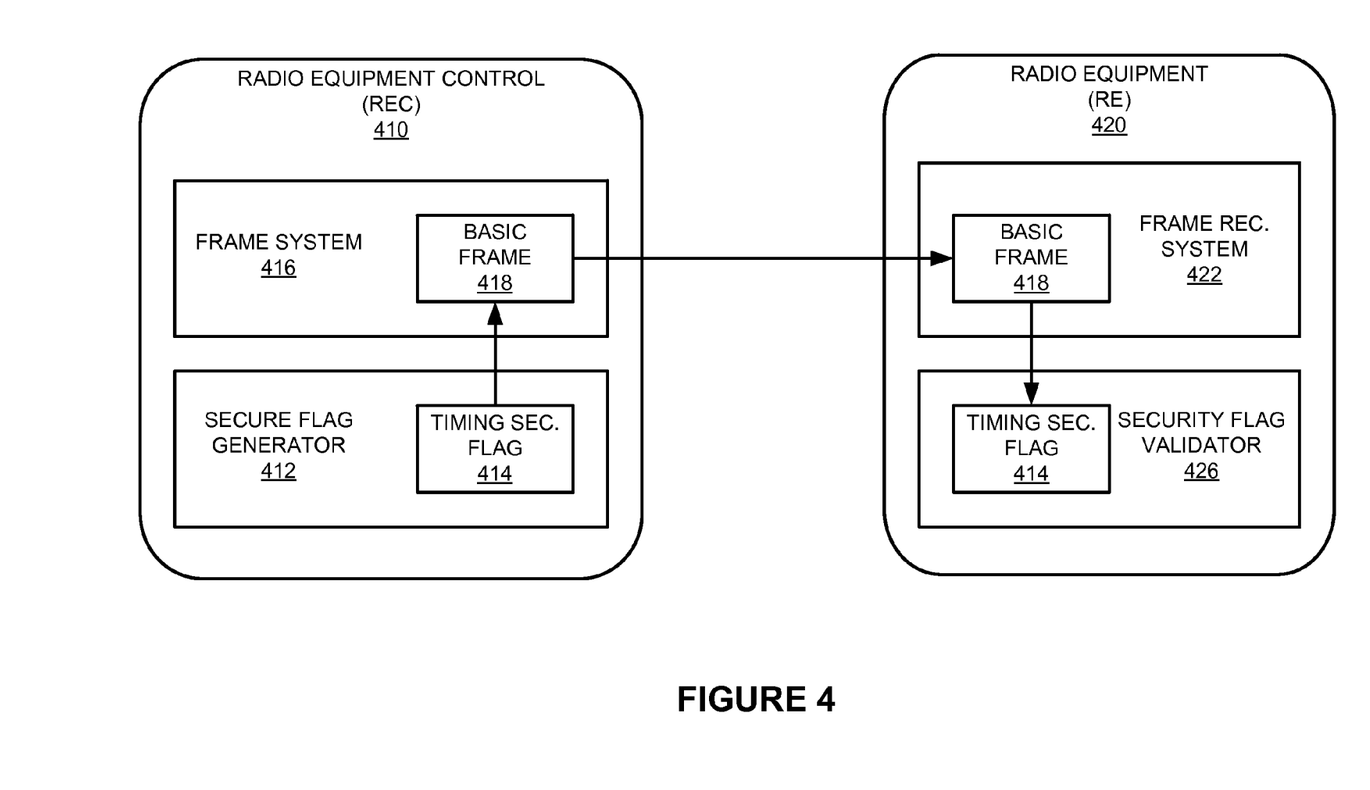
FIG. 4 illustrates an overview of using Common Public Radio Interface with timing security flags.

FIG. 4 illustrates an overview of implementing timing security flags within basic frames. FIG. 4 includes radio equipment control (REC) 410 and radio equipment (RE) 420. REC 410 further includes secure flag generator 412 and frame system 416, while RE 420 further includes frame receiving system 422 and security flag validator 426.

In operation, REC 410 will use CPRI protocol to transmit control information and data to RE 420. CPRI protocol includes the transmission of basic frames that comprise a control portion that identifies timing and synchronization of the communication among other details, and a data portion to provide information to RE 120. In the present example, REC 410 includes secure flag generator 412. Secure flag generator 412 is an example of a "secure zone" within REC 410, and is an example of secure processing circuitry 114. Secure flag generator generates timing security flags, such as timing security flag 414, to be implemented within the basic frames that are transmitted between REC 410 and RE 420. A timing security flag may be one or more arbitrary bits that pre-generated and stored within the "secure zone," may be generated using any type of hashing, may be generated based on timing and a secure key on RE 410, or may be generated by any other method. Here, timing security flag 414, after being generated by secure flag generator 412, is implemented within basic frame 418. Once integrated within basic frame 418, the frame is then transmitted using to RE 420.

After transmission, RE 420 receives basic frame 418 and will look to process the contents of basic frame 418 using frame receiving system 422. To verify the frame, timing security flag 414 is passed to security flag validator 426 to ensure the validity of the frame. Security flag validator 426 may reverse the process that created the flag, may compare the flag to an expected flag, or may execute any other process to compare timing security flag 414.

Once the flag has been validated, the frame will be accepted and the information from the frame processed. If, however, security flag validator 426 does not validate the security flag, then the information that was passed in basic frame 418 may be ignored or flagged as a possible security issue. In some examples, upon the discovery of a frame with an improper validation flag, the communication line between REC 410 and RE 420 may be cut off such that no more information may be passed between REC 410 and RE 420.

Figure 5:
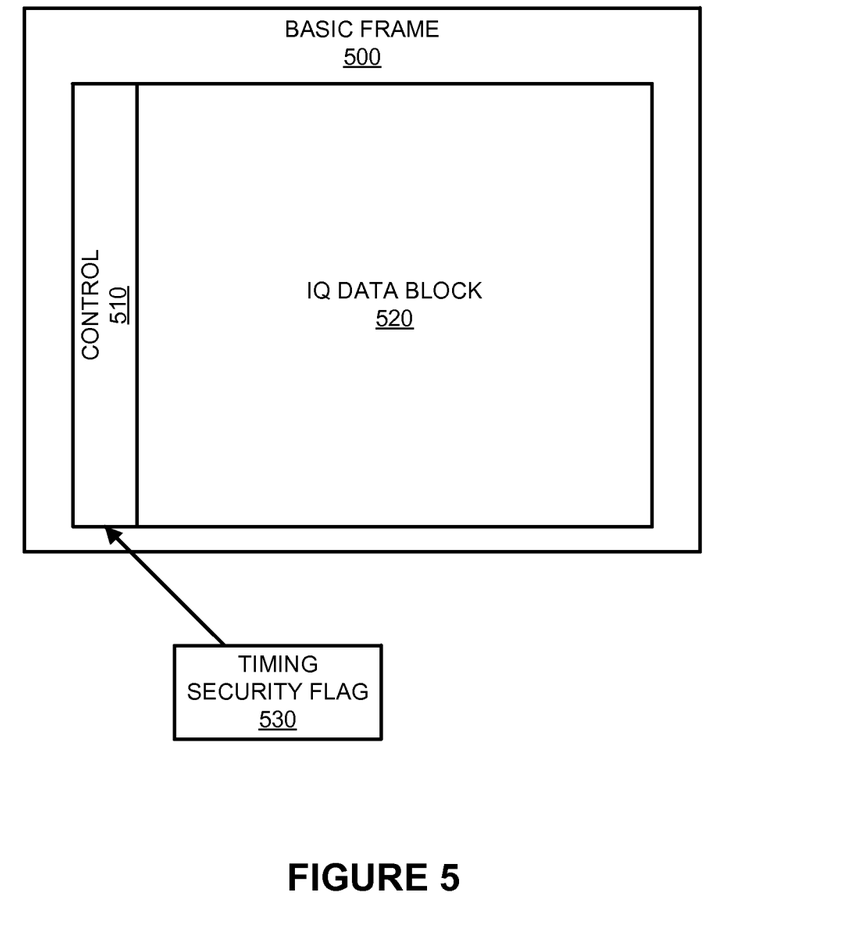
FIG. 5 illustrates inserting a timing security flag into a basic frame.

FIG. 5 illustrates the insertion of a timing security flag into a basic frame 500. FIG. 5 includes basic frame 500, control 510, IQ data block 520, and timing security flag 530. In operation, timing security flag 530 will be generated using a "secure zone" within a radio equipment control system, such as REC system 110. This "secure zone" may define the security flag by producing a variety of pre-stored security flags, may generate the security flag based on hashing, may generate the security flag based on applying a security key to an algorithm, or may produce an arbitrary bit pattern by any other method. The size of timing security flag 530 may be a single bit, or may be any other length that is capable of being transmitted within basic frame 500.

Once timing security flag 530 has been generated, the flag may then be inserted into a basic frame that is to be passed to a radio equipment system. In the present instance, timing security flag 530 is inserted into control 510. Control 510 is responsible for passing timing and synchronization information amongst other information. Here, timing security flag 530 may be inserted within the control information to ensure the validity of the frames being passed to the radio equipment system. Upon transfer of basic frame 500 to the radio equipment system, timing security flag 530 will be separated from frame 500 and interpreted to determine the flags validity. In some examples, the radio equipment may reverse the process that generated the flag and compare the result of this process to determine the validity. In another occurrence, the radio equipment may be generating security flags and may simply compare the timing security flag 530 to a flag generated on the radio equipment. Once validated, the radio equipment may process the remainder of control 510 and IQ data block 520.

If, however, the flag is determined to be invalid, the radio equipment may skip processing the remainder of control 510 and IQ data block 520. Further, the radio equipment may cease communication with the radio equipment control system or may flag the transmission for further analysis of the issue.

Figure 6:
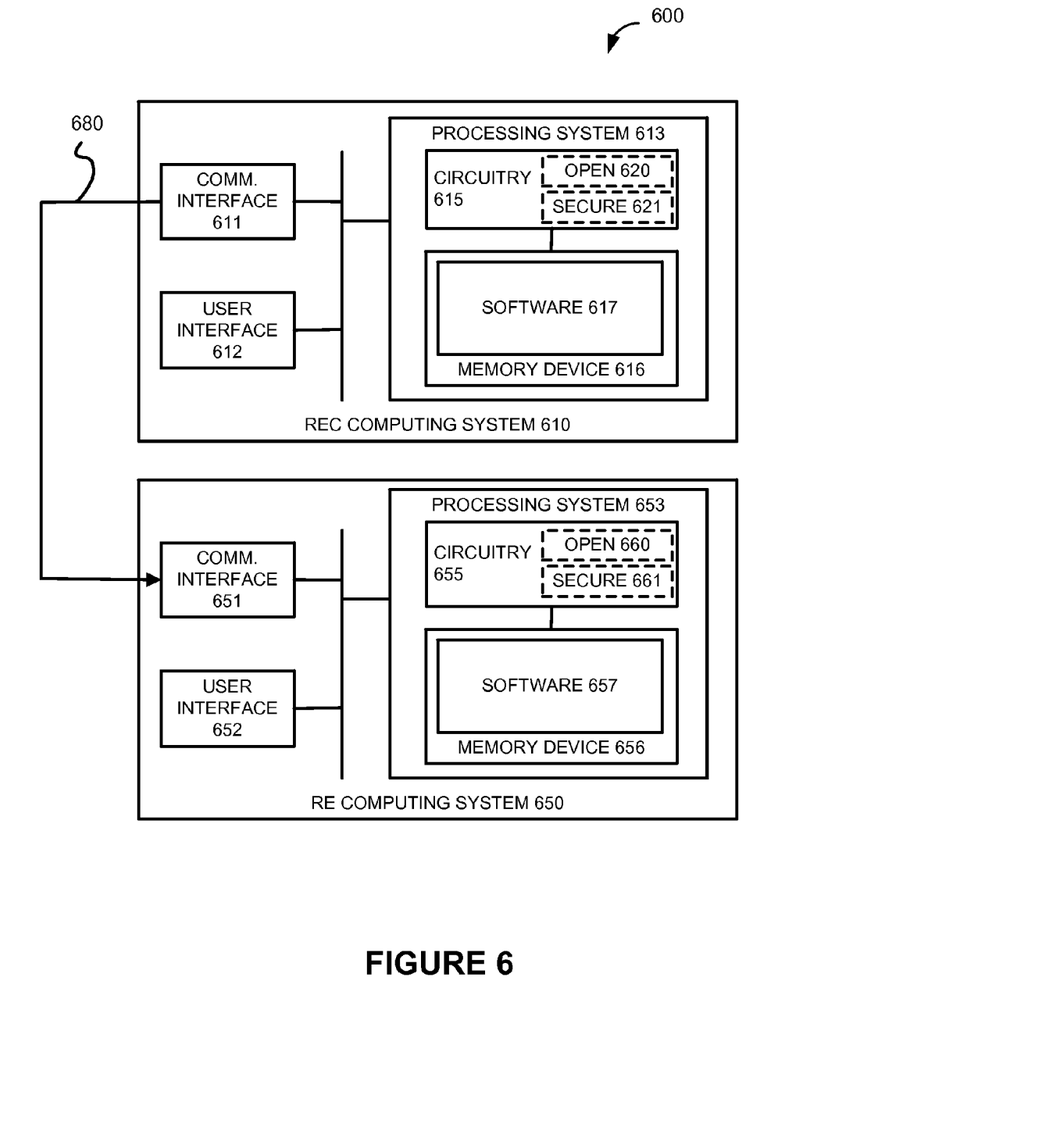
FIG. 6 illustrates a computing environment for using Common Public Radio Interface with timing security flags.

FIG. 6 illustrates a computing environment 600 for communicating using CPRI format. Computing environment 600 includes radio equipment control (REC) computing system 610 and radio equipment (RE) computing system 650. REC computing system 610 is an example of REC system 110, although other examples may exist. REC computing system 610 includes communication interface 611, user interface 612, and processing system 613. Processing system 613 is linked to communication interface 611 and user interface 612. Processing system 613 includes processing circuitry 615 and memory device 616 that stores operating software 617. Processing circuitry 615 may include both an open circuitry 620 and a secure circuitry 621, and software 617 may include secure software as well as open software.

Communication interface 611 comprises components that communicate using CPRI over communication link 680. Such components may include network cards, ports, processing circuitry and software, or some other communication components. Communication interface 611 may be configured to communicate over metallic, wireless, or optical links. In the present example, communication interface 611 is configured to transmit basic frames that make up CPRI protocol to RE computing system 650. These frames include both a control portion that describes timing and synchronization information, as well data portion that provides information to RE computing system 650. Further, one or more of the frames that are passed between REC computing system 610 and RE computing system 650 include a timing security flag to ensure the validity of the transmission between the systems.

User interface 612 comprises components that interact with a user. User interface 612 may include a keyboard, display screen, mouse, touch pad, or some other user input/output apparatus. In some examples, user interface 612 may provide feedback on the transmission status between REC computing system 610 and RE computing system 650. Such feedback may include a buzzer, a visual notification, or some other alert if an issue occurs during transmission of the frames. Some issues may include a synchronization error between the REC computing system and RE computing system, a cutoff of the RE computing system from the REC computing system, or any other issue in the transmission. In some examples, rather than exercising user interface 612, issues in the transmission may be flagged and stored in memory 656 or transmitted externally to an administrator using communication interface 611. User interface 612 may be omitted in some examples.

Processing circuitry 615 comprises microprocessor and other circuitry that retrieves and executes operating software 617 from memory device 616. Memory device 616 comprises a non-transitory storage medium, such as a disk drive, flash drive, data storage circuitry, or some other memory apparatus. Operating software 617 comprises computer programs, firmware, or some other form of machine-readable processing instructions. Operating software 617 may include an operating system, utilities, drivers, network interfaces, applications, or some other type of software. When executed by circuitry 615, operating software 617 directs processing system 613 to operate communication control system 610 as described herein.

In the present instance, processing system 613 includes open processing circuitry 620 and secure processing circuitry 621. Each circuitry of the processing system may be implemented in a separate microprocessor, microprocessor core, virtual core, or other hardware or software partition that separates memory spaces, operating systems, drivers, and other operational hardware and software elements so as to provide a restricted level of access for the creation of the timing security flags.

In the included example, when in operation, software 617 directs REC computing system 610 to generate a timing security flag for a basic frame, insert the security flag into the basic frame, and initiate transfer of the basic frame to RE computing system 650. Secure circuitry 621 of processing system 613 may be responsible for generating the flag based on pre-stored flags, may generate the flag based on hashing, or may generate the security flag by any other method to ensure verification of the frames that are passed between REC computing system 610 and RE computing system 650. In some occurrences, the timing security flag generated within secure processing circuitry 621 comprises an arbitrary bit pattern that may be generated using any of the aforementioned methods.

RE computing system 650 is an example of RE system 620, although other examples may exist. RE computing system 650 is an example of RE system 120, although other examples may exist. RE computing system 650 includes communication interface 651, user interface 652, and processing system 653. Processing system 653 is linked to communication interface 651 and user interface 652. Processing system 653 includes processing circuitry 655 and memory device 656 that stores operating software 657. Processing circuitry 655 may include both an open circuitry 660 and a secure circuitry 661, and software 657 may include secure software as well as open software.

Communication interface 651 comprises components that communicate using CPRI protocol over communication link 680. Such components may include network cards, ports, processing circuitry and software, or some other communication components. Communication interface 651 may be configured to communicate over metallic, wireless, or optical links. In the present example, communication interface 651 is configured to receive data using CPRI protocol from REC computing system 610. CPRI protocol includes frames that comprise a control portion that passes synchronization and timing information, amongst other information, as well as a data portion that is used to pass information to RE computing system. In at least one of the frames that is passed from REC computing system 610 to RE computing system 650 a timing security flag will be included. This flag may then analyzed in RE computing system 650 to ensure the validity of the frames being passed to it.

User interface 652 comprises components that interact with a user. User interface 652 may include a keyboard, display screen, mouse, touch pad, or some other user input/output apparatus. In some examples, user interface 652 may be used to highlight issues in the receipt of frames from REC computing system 610. Such issues may include a timing or synchronization issue with the frames, an invalidation of a timing security flag, or any other possible issue. These issues may be highlighted by visually representing the issue on a monitor or some other visual device, may be highlighted by making a tone or some other audio notification, or may be highlighted by any other method. In some examples, rather than exercising user interface 652, issues in the transmission may be flagged and stored in memory 656 or transmitted externally to an administrator using communication interface 651. User interface 652 may be omitted in some examples.

Processing circuitry 655 comprises microprocessor and other circuitry that retrieves and executes operating software 657 from memory device 656. Memory device 656 comprises a non-transitory storage medium, such as a disk drive, flash drive, data storage circuitry, or some other memory apparatus. Operating software 657 comprises computer programs, firmware, or some other form of machine-readable processing instructions. Operating software 657 may include an operating system, utilities, drivers, network interfaces, applications, or some other type of software. When executed by circuitry 655, operating software 657 directs processing system 653 to operate REC computing system 650 as described herein.

In the present example, processing system 653 includes open processing circuitry 660 and secure processing circuitry 661. Each circuitry of the processing system may be implemented in a separate microprocessor, microprocessor core, virtual core, or other hardware or software partition that separates memory spaces, operating systems, drivers, and other operational hardware and software elements so as to provide a restricted level of access for determining the validity timing security flags.

In the included instance, software 657 directs RE computing system 650 to receive the basic frame that was sent from REC computing system 610. Software 657 further directs RE computing system 650 to identify validity of the timing security flag using secure processing circuitry 621, and, upon validation, process the basic frame including the timing information therein.

Communication link 680 may use metal, glass, optical, air, space, or some other material as the transport media. Communication link 680 is used to communicate using CPRI protocol between REC computing system 610 and RE computing system 650. Communication link 680 may be a direct link or may include intermediate networks, systems, or devices, and may include a logical network link transported over multiple physical links.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for secure Common Public Radio Interface communication, the system comprising:
   a radio equipment control system configured to:
   generate, using secure processing circuitry, a timing security flag for a basic frame;
   insert the security flag into the basic frame; and
   initiate transfer of the basic frame to a radio equipment system; and
   the radio equipment system configured to:
   receive the basic frame;
   identify validity of the timing security flag; and
   upon validation, update timing on the radio equipment system.

2. The system of claim 1 wherein the radio equipment system configured to identify the validity of the timing security flag is configured to identify, using second secure processing circuitry, the validity of the timing security flag.

3. The system of claim 1 wherein the timing security flag is generated using hashing within the secure processing circuitry of the radio equipment control system.

4. The system of claim 1 wherein the timing security flag is inserted into a control portion of the basic frame.

5. The system of claim 1 wherein the timing security flag comprises an arbitrary bit pattern.

6. The system of claim 1 wherein the validity of the timing security flag is determined based on comparing the timing security flag to an expected security flag.

7. The system of claim 1 wherein the radio equipment system is further configured to:
   upon invalidation, cease communication with the radio equipment control system.

8. The system of claim 1 wherein the basic frame comprises a control portion and a data portion.

9. The system of claim 1 wherein the timing includes synchronization information between the radio equipment control system and the radio equipment system.

10. A method of operating a radio equipment control system, the method comprising: generating, using secure processing circuitry, a timing security flag for a basic frame; inserting the timing security flag into the basic frame; and initiating transfer of the basic frame to a radio equipment system, wherein the radio equipment system is configured to identify validity of the timing security flag and, upon validation, update timing on the radio equipment.

11. The method of claim 10 wherein the basic frame comprises a control portion and a data portion.

12. The method of claim 11 wherein the timing security flag is inserted into the control portion of the basic frame.

13. The method of claim 10 wherein the timing security flag is generated using secure processing circuitry of the radio equipment control system.

14. The method of claim 10 wherein the timing security flag comprises an arbitrary bit pattern.

15. The method of claim 10 wherein the timing security flag is generated by hashing.

16. A method of operating a radio equipment system, the method comprising: receiving a basic frame that was transmitted by a radio equipment control system; identifying validity of a timing security flag within the basic frame by comparing the timing security flag to an expected security flag; upon validation, updating timing on the radio equipment system; and upon invalidation, ceasing communication with the radio equipment control system.

17. The method of claim 16 wherein the timing security flag comprises an arbitrary bit pattern.

18. The method of claim 16 wherein the basic frame comprises a control portion and a data portion, and wherein the control portion comprises the timing security flag.

19. The method of claim 16 wherein the timing includes synchronization information between the radio equipment control system and the radio equipment system.

* * * * *